US011947541B1

(12) United States Patent
Franz et al.

(10) Patent No.: US 11,947,541 B1
(45) Date of Patent: Apr. 2, 2024

(54) TABLE USER-DEFINED FUNCTION FOR GRAPH DATA PROCESSING

(71) Applicant: SAP SE, Walldorf (DE)

(72) Inventors: Gerald Franz, Walldorf (DE); Romans Kasperovics, Speyer (DE); Umang Rawat, Heidelberg (DE); Roland Sedler, Dossenheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/931,865

(22) Filed: Sep. 13, 2022

(51) Int. Cl.
*G06F 16/2455* (2019.01)
*G06F 16/901* (2019.01)

(52) U.S. Cl.
CPC .... *G06F 16/24553* (2019.01); *G06F 16/9024* (2019.01)

(58) Field of Classification Search
CPC ............ G06F 16/245; G06F 16/90335; G06F 16/284; G06F 16/9024; G06F 8/41
See application file for complete search history.

(56) References Cited

U.S. PATENT DOCUMENTS

| 2015/0026158 A1* | 1/2015 | Jin ................... G06F 16/90335 707/769 |
| 2017/0147705 A1* | 5/2017 | Kasperovics ....... G06F 16/2433 |
| 2018/0218065 A1* | 8/2018 | Fischer ................ G06F 16/288 |
| 2021/0256063 A1* | 8/2021 | Kasperovics ....... G06F 16/9024 |

* cited by examiner

*Primary Examiner* — Hau H Hoang
(74) *Attorney, Agent, or Firm* — Mintz Levin Cohn Ferris Glovsky and Popeo, P.C.

(57) ABSTRACT

A method may include receiving a definition of a table user-defined function (TUDF) in a graph query language. The table user-defined function may be created based on the definition. For example, the creation of the table user-defined function may include checking and compiling the definition to generate executable code associated with the table user-defined function. Upon receiving a query including a relational query language statement invoking the table user-defined function, such as a structured query language select statement, the query may be executed on at least a portion of a graph data stored in a database. The executing of the query may include calling the executable code to execute the table user-defined function included in the relational query language statement. Related systems and computer program products are also provided.

18 Claims, 4 Drawing Sheets

TABLE USER-DEFINED FUNCTION FOR GRAPH DATA PROCESSING

TECHNICAL FIELD

The subject matter described herein relates generally to database processing and more specifically to the processing of graph data stored in a relational database.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items. Contrastingly, a relational database may store the relationships between different data items implicitly, for example, by organizing the data items into one or more database tables. A relational database may be configured to store graph data, for example, by storing the vertices of a graph in a vertex table and the edges of the graph in a separate edge table.

SUMMARY

Systems, methods, and articles of manufacture, including computer program products, are provided for a table user-defined function. In one aspect, there is provided a system including at least one data processor and at least one memory. The at least one memory may store instructions that cause operations when executed by the at least one data processor. The operations may include: receiving a definition of a table user-defined function (TUDF) in a graph query language; creating, based at least on the definition, the table user-defined function; receiving a query including a relational query language statement invoking the table user-defined function; and executing, on at least a portion of a graph data stored in a database, the query including by executing the table user-defined function included in the relational query language statement.

In another aspect, there is provided a method for a table user-defined function. The method may include: receiving a definition of a table user-defined function (TUDF) in a graph query language; creating, based at least on the definition, the table user-defined function; receiving a query including a relational query language statement invoking the table user-defined function; and executing, on at least a portion of a graph data stored in a database, the query including by executing the table user-defined function included in the relational query language statement.

In another aspect, there is provided a computer program product including a non-transitory computer readable medium storing instructions. The instructions may cause operations may executed by at least one data processor. The operations may include: receiving a definition of a table user-defined function (TUDF) in a graph query language; creating, based at least on the definition, the table user-defined function; receiving a query including a relational query language statement invoking the table user-defined function; and executing, on at least a portion of a graph data stored in a database, the query including by executing the table user-defined function included in the relational query language statement.

In some variations of the methods, systems, and non-transitory computer readable media, one or more of the following features can optionally be included in any feasible combination.

In some variations, the table user-defined function may be defined to perform graph specific processing on a graph workspace containing one or more vertex tables and edge tables forming the graph data.

In some variations, a schema qualified name of the table user-defined function specified in the definition may be verified to be unique within a schema of a graph workspace referenced in the definition and adhering to a naming convention associated with the relational query language.

In some variations, a creator of the table user-defined function may be verified to have a privilege to define a function and/or replace a function in a given schema.

In some variations, the definition of the table user-defined function may be compiled to generate an executable code associated with the table user-defined function.

In some variations, the compiling of the definition of the table user-defined function may include verifying an existence and validity of one or more graph workspaces referenced in the definition of the table use-defined function.

In some variations, the compiling of the definition of the table user-defined function may include verifying that a first table type of a table output by the table user-defined function matches a second table type defined in a function signature.

In some variations, the compiling of the definition of the table user-defined function may include verifying that each execution path within the definition returns a same table type.

In some variations, the table user-defined function may be executed by at least calling the executable code associated with the table user-defined function.

In some variations, the table user-defined function may implement a graph processing algorithm comprising one or more of subgraph, inverse graph, in-degree, out-degree, incoming edges, outgoing edges, neighbors, is-reachable, shortest path, shortest path one to all, k shortest paths, strongly connected components, depth first traversal, and breadth first traversal.

In some variations, the graph query language may be GraphScript.

In some variations, the relational query language statement may be a structured query language (SQL) select statement. The table user-defined function may be invoked in a FROM clause of the SQL select statement.

In some variations, the table user-defined function may provide read-only access to the graph data.

In some variations, the definition of the table user-defined function may specify one or more of a name of the table user-defined function, a schema name of the table user-defined function, a parameter of the table user-defined function, a security mode of the table user-defined function, and a type of table output by the table user-defined function.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the processing of graph data, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database storing graph data may support graph processing algorithms including, for example, shortest path, risk propagation, minimum flow, page rank, and/or the like. Graph data processing in a relational database may include defining one or more stored procedures. For example, the relational database may store the vertex table and the edge table of a graph in a graph workspace while the graph algorithms operating on the graph may be defined as stored procedures. The graph workspace and each stored procedure may be separate database objects registered in the metadata catalog of the relational database.

Stored procedures are typically defined using a graph query language. One example of a graph query language is GraphScript, which is an imperative programming language providing a high-level interface for accessing graph data defined in graph workspaces. For example, GraphScript provides a suite of built-in and reusable graph processing algorithms for neighborhood exploration (e.g., neighbors, reachable_vertices, in_edges, out_edges, in_degree, out_degree, and/or the like), shortest paths (e.g., shortest path one-to-one, top k shortest paths, shortest paths one-to-all, and/or the like), inverse graph, subgraph, strongly connected components, graph traversals (e.g., depth first traversal and breadth first traversal with vertex and edge hook functions).

Nevertheless, conventional graph query languages, such as GraphScript, provide limited integration with relational data processing, which relies on declarative relational query languages such as Structured Query Language (SQL). For example, GraphScript supports a subset of relational (e.g., Structured Query Language (SQL)) datatypes (e.g., integer, bigint, double, Boolean, nvarchar, timestamp, varbinary, geometry, and/or the like), graph specific datatypes (graph, vertex, edge, weighted path, and/or the like), and container datatypes (e.g., map, multiset, sequence, and/or the like). However, a stored procedure defined in a graph query language (e.g., GraphScript) cannot be invoked from a relational query language statement (e.g., a Structured Query Language (SQL) statement). For instance, a stored procedure defined in GraphScript cannot be included in the FROM clause of a SQL select statement, which is integral to implementing a variety of critical relational operations such as join and filter.

As such, in some example embodiments, a relational database storing graph data may support of a table user-defined function (TUDF), which may be defined in a graph query language (e.g., GraphScript) and executed on the graph data stored in the relational database to output tabular data (e.g., a table). Accordingly, the table user-defined function (TUDF) may be invoked from a relational query language statement (e.g., Structured Query Language (SQL)) such as the FROM clause of a SQL select statement.

Figure 1:
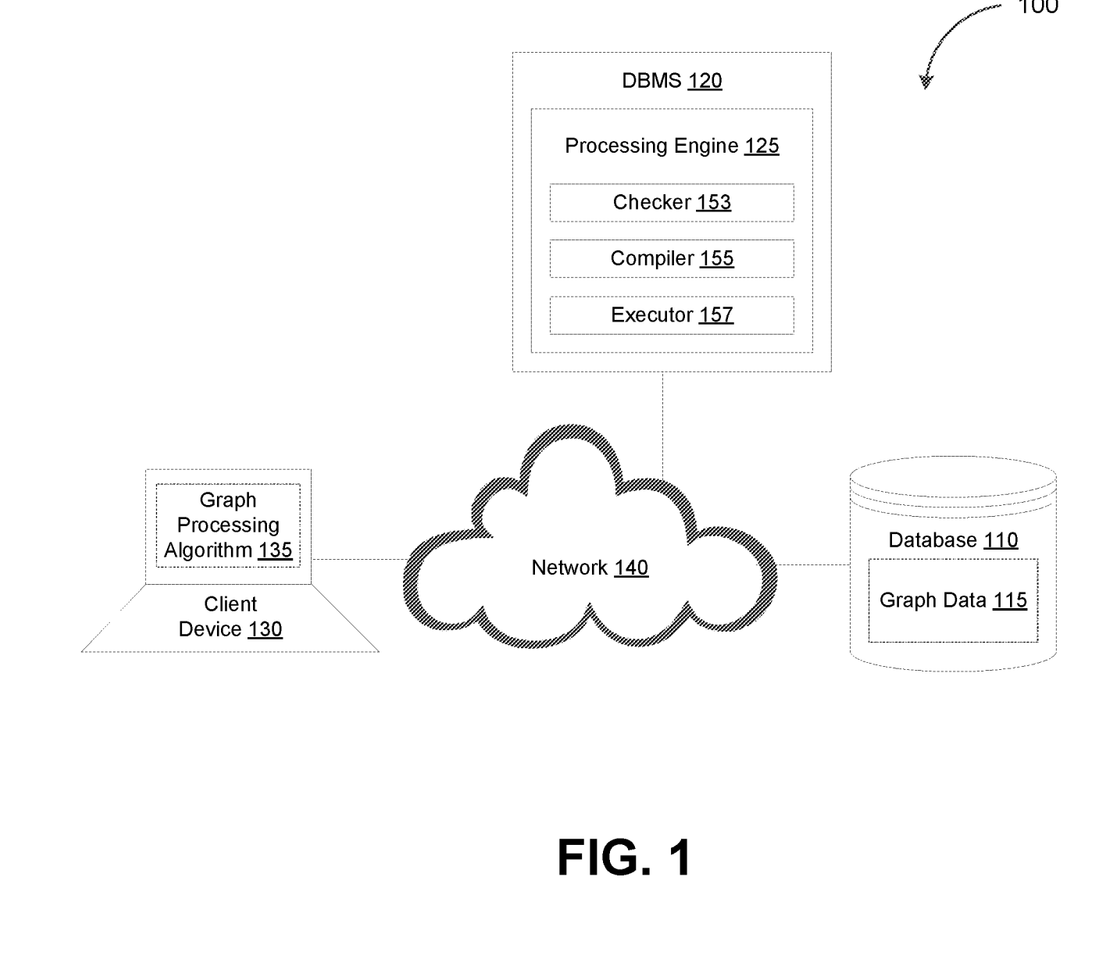
FIG. 1 depicts a system diagram illustrating an example of a graph data processing system, in accordance with some example embodiments.

FIG. 1 depicts an example of a graph data processing system 100, in accordance with some example embodiments. Referring to FIG. 1, the graph data processing system 110 may include a database 110 storing a graph data 115, a database management system 120 including a processing engine 125, and a client device 130. The graph database 110, the database management system 120, and the client device 130 may be communicatively coupled via a network 140. In some example embodiments, the database 110 may be a relational database configured to store the graph data 115. However, it should be appreciated that the database 110 may be any type of database including, for example, an in-memory database, a hierarchical database, an object database, an object-relational database, a non-Structured Query Language (NoSQL) database, and/or the like. For example, instead of and/or in addition to being a relational database, the database 115 may be a graph database, a column store, a key-value store, a document store, and/or the like.

The database management system 120 may be configured to respond to requests from one or more client devices including, for example, the client device 130. For example, as shown in FIG. 1, the client device 130 may communicate with the database management system 110 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a smartphone, a tablet computer, a wearable apparatus, a virtual assistant, an Internet-of-Things (IoT) appliance, and/or the like.

The client device 130 may send, to the database management system 130, a request to execute a graph processing algorithm 135 that derives a solution by operating on the graph data 115 stored in the database 110. The graph processing algorithm 135 may include one or more graph processing algorithms including, for example, subgraph, inverse graph, in-degree, out-degree, incoming edges, outgoing edges, neighbors, is-reachable, shortest path, shortest path one to all, k shortest paths, strongly connected components, depth first traversal, breadth first traversal, and/or the like.

Figure 2:
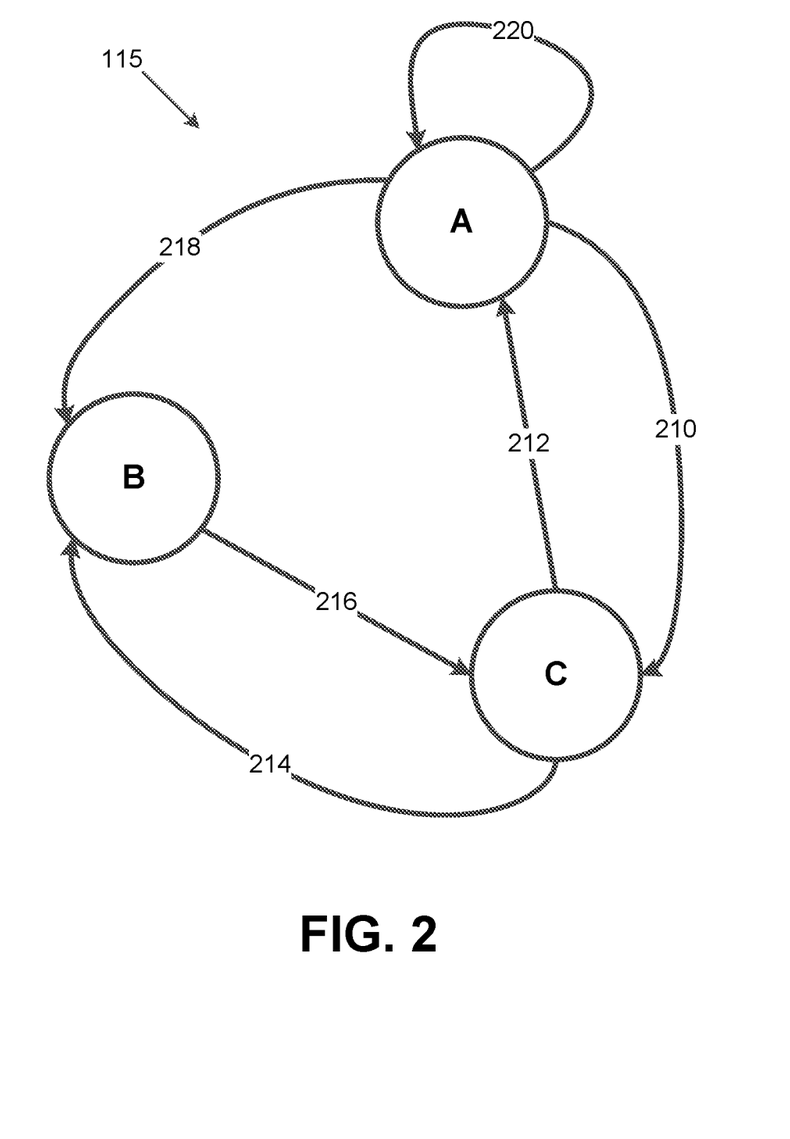
FIG. 2 depicts an example of graph data, in accordance with some example embodiments.

FIG. 2 depicts an example of the graph data 115 stored in the database 115, for example, in a vertex table and an edge table. As shown in FIG. 2, the graph data 115 may include one or more vertices including, for example, a first vertex A, a second vertex B, and a third vertex C. Furthermore, the one or more vertices 210 may be interconnected via one or more edges including, for example, a first edge 210, a second edge 212, a third edge 214, a fourth edge 216, a fifth edge 218, and a sixth edge 220. In the example of the graph data 115 shown in FIG. 2, the one or more edges are directed edges but it should be appreciated that the one or more edges may also be undirected edges interconnecting the one or more vertices. To execute the graph processing algorithm 135, the processing engine 125 may access the vertex table storing the first vertex A, the second vertex B, and the third vertex C. Moreover, in some instances, the processing engine 125 may execute the graph processing algorithm 135 by accessing the edge table storing the first edge 210, the second edge 212, the third edge 214, the fourth edge 216, the fifth edge 218, and the sixth edge 220.

The graph processing algorithm 135 may be defined, for example, at the client device 130, in a graph query language such as GraphScript. In some cases, the graph processing algorithm 135 may be defined as a stored procedure, in which case the graph processing algorithm 135 may process a graph workspace defined on the vertex tables and edge tables of the graph data 115. To improve integration with relational data processing, which relies on declarative relational query languages such as Structured Query Language (SQL), the graph processing algorithm 135 may be defined as a table user-defined function (TUDF). For example, the table user-defined function (TUDF) may be defined in a graph query language (e.g., GraphScript) and executed on the graph data 115 stored in the database 110 to output tabular data. The table user-defined function (TUDF) may enable the consumption of graph query language (e.g., GraphScript). For instance, the graph processing algorithm 135, which is defined in a query processing language (e.g., GraphScript) may be wrapped in SQLScript table user-defined function (TUDF) in order to be used in a relational query language statement (e.g., Structured Query Language (SQL) statement). Accordingly, defined as a graph table user-defined function (Graph TUDF), the graph processing algorithm 135 may be invoked directly from a relational query language statement (e.g., Structured Query Language (SQL)) such as the FROM clause of a SQL select statement without the need to wrap the graph processing logic in a SQLScript table user-defined function as is the case for graph stored procedures.

Table 1 below depicts an example syntax for creating a table user-defined function (TUDF) or replacing an existing table user-defined function.

TABLE 1

```
CREATE [OR REPLACE] FUNCTION <func_name>
    [(<input_parameter_clause>)]
    RETURNS <return_table_type>
LANGUAGE GRAPH
[SQL SECURITY <mode>]
[DEFAULT SCHEMA <default_schema_name>]
[READS SQL DATA]
AS BEGIN
    <GraphScript_function_body>
    RETURN SELECT ...;
END;
<mode> ::= DEFINER | INVOKER
```

When defined in the manner shown in Table 1, the resulting table user-defined function (TUDF) may be invoked from a relational query language statement such as the Structured Query Language (SQL) select statement in Table 2 below.

TABLE 2

```
SELECT * FROM <func_name>([params])[...JOIN...];
```

Referring to the example syntax shown in Table 1, the name of the table user-defined function may be specified by the element <function_name>. In some cases, the name of the table user-defined function may be specified along with an optional schema name (e.g., <function_name>::= [<schema_name><identifier>). One or more parameters of the table user-defined function may be specified by the element <function_parameters>. It should be appreciated that the parameters of the table user-defined function may be limited to input parameters (e.g., <in_parameters>). Moreover, Table 3 below shows that the parameters of the table user-defined function may be defined with a <parameter_name> and either a datatype or table type (e.g., <data_or_table_type>). Examples of scalar datatypes (e.g., <scalar_type>) include integer, big integer, double, Boolean, variable length characters (NVARCHAR), and timestamp.

TABLE 3

```
<function_parameters>::=<in_parameter> [ { , <in_parameter> } [...]]
<in_parameter>::=[IN] <parameter_name> <data_or_table_type>
<data_or_table_type>::=<scalar_type>|<table_type>|<table_type_definition>
<scalar_type>::=INTEGER|BIGINT|DOUBLE|BOOLEAN|NVARCHAR[(<unsigned_integer>)]|TIMESTAMP
<table_type>::=[<schema_name>.]<identifier>
```

In cases where the table type <table_type> was previously defined (e.g., with a CREATE TYPE statement), Table 4 below depicts the syntax for referencing the previously defined table type.

TABLE 4

<table_type_definition> ::= TABLE (<column_list_definition>)
<column_list_definition> ::= <column_definition> [ { , <column_definition> } [...] ]
<column_definition> ::= <column_name> <scalar_data_type>

Referring again to the example syntax shown in Table 1, the return clause of the table user-defined function (TUDF) definition defines the type of table that is output by the table user-defined function (e.g., <return_clause>::=RETURNS {<table_type>|<table_type_definition>}). The element <sql_security_mode>::=SQL SECURITY <mode> specifies the security mode of the table user-defined function as either a DEFINER security mode or an INVOKER security mode (e.g., <mode>::=DEFINER|INVOKER). In the DEFINER security mode, the table user-defined function is executed with the privileges of the definer (or creator) of the function. Alternatively, in the INVOKER security mode, the table user-defined function is executed with the privileges of the invoker (or caller) of the function. The element <default_schema_specification>::=DEFAULT SCHEMA <schema_name> specifies the schema for unqualified objects included in the definition of the table user-defined function but is optional. As such, in the absence of a default schema specification, the current schema at the time the table user-defined function is defined may be used.

In some example embodiments, the table user-defined function (TUDF) may support the complete feature set of the corresponding graph query language (e.g., GraphScript and/or the like). However, as noted above, the parameters of the table user-defined function may be limited to input parameters while the output of the table user-defined function may be tabular data (e.g., a table having a type defined in the return clause of the definition). Moreover, the table user-defined function (TUDF) may provide read-only access to the underlying graph data 115. That is, the table user-defined function (TUDF) does not modify the graph data 115. In some cases, the table user-defined function may be configured to read data in a relational query language (e.g., READS SQL DATA).

To further illustrate, Table 5 below depicts an example definition for the table user-defined function COMPANY_SCHEMA.CONTRIBUTING_EMPLOYEES, which outputs a table enumerating the first name and last name of each employee who have contributed to a customer.

Table 6 depicts an example of a Structured Query Language (SQL) select statement invoking the table user-defined function COMPANY_SCHEMA.CONTRIBUTING_EMPLOYEES.

TABLE 6

SELECT FIRST_NAME, LAST_NAME
FROM COMPANY_SCHEMA.CONTRIBUTING_EMPLOYEES(?)
ORDER BY LAST_NAME, FIRST_NAME;

In some example embodiments, the processing engine 125 may respond to receiving, from the client device 130, a definition of the graph processing algorithm 135 as a table user-defined function (TUDF) by at least checking and compiling the table user-defined function for subsequent execution, for example, when invoked as a part of a query on the graph data 115. The checking and compilation as well as subsequent execution of the table user-defined function may be enabled by at least extending the grammar of the relational query language (e.g., Structured Query Language (SQL)) and the corresponding parser with the syntax for table user-defined functions in the graph query language (e.g., GraphScript). As shown in FIG. 1, the processing engine 125 may include a checker 153 (e.g., SQL checker) configured to verify whether the schema qualified name of a table user-defined function specified in the corresponding definition is unique within the corresponding graph workspace schema and adheres to the naming conventions associated with the relational query language (e.g., SQL naming conventions). Moreover, the checker 153 may verify whether the creator (or definer) of the table user-defined function has the necessary privileges (e.g., CREATE FUNCTION or REPLACE FUNCTION privileges) in the given schema.

Referring again to FIG. 1, the processing engine 125 may also include a compiler 155 configured to compile the definition of the table user-defined function once the definition passes the checks performed by the checker 153. During the compilation of the table user-defined function, the compiler 155 may compile the definition of the table user-defined function in the graph query language (e.g., GraphScript) to generate executable code. This compilation phase may include verifying the existence and validity of the

TABLE 5

CREATE OR REPLACE FUNCTION COMPANY_SCHEMA.CONTRIBUTING_EMPLOYEES
    (CUSTOMER_ID BIGINT -- The key of the customer in the CUSTOMERS table)
  RETURNS TABLE (FIRST_NAME NVARCHAR(100), LAST_NAME NVARCHAR(100))
LANGUAGE GRAPH
AS BEGIN
    GRAPH g = GRAPH("COMPANY_SCHEMA", "COMPANY_GRAPH");
    VERTEX v_customer = VERTEX(:g, 'CUSTOMERS', :CUSTOMER_ID);
    MULTISET<VERTEX> m_neighbors = NEIGHBORS(:g, :v_customer, 1, 3, 'ANY');
    MULTISET<VERTEX> m_employees = v in :m_neighbors where LABEL(:v) == 'Employee';
    RETURN SELECT :v.FIRST_NAME, :v.LAST_NAME FOREACH v IN :m_employees;
END;

referenced graph workspaces and ensuring that the creator (or definer) of the table user-defined function (TUDF) has the necessary privileges to create function (e.g., CREATE FUNCTION privilege) and the select privilege on the referenced workspaces. The compilation of the table user-defined function definition may also include the compiler 155 verifying that the table type of the table output by the table user-defined function matches the one defined in the function signature. Furthermore, the compilation of the table user-defined function definition may include the compiler 155 verifying that each execution path within the definition returns the same table type.

Once the compilation of the definition of the table user-defined function is complete, the resulting executable code may be stored for subsequent execution by an executor 157 of the processing engine 125. For example, the executor 157 may call the executable code associated with the table user-defined function when executing a query that invokes the table user-defined function (e.g., in a SQL select statement). The graph workspaces that are referenced by the table user-defined function may be registered as direct dependencies of the table user-defined function. Subsequent changes to a referenced graph workspace may trigger a recompilation of the table user-defined function definition. For example, a referenced graph workspace may be changed due to changes to a vertex table and/or an edge table included the graph workspace (e.g. a table is dropped, a column is added or dropped, and/or the like), in which case the table user-defined function is recompiled and its validity updated.

In some example embodiments, once compiled, the table user-defined function may be used in a query, such as in one or more relational query language statements contained in the query. For example, the processing engine 125 may receive, from the client device 130, a query containing a relational query language statement (e.g., SQL select statement) invoking the table user-defined function. In response to receiving the query, the checker 153 may resolve the table names specified in the FROM clause of the relational query language statement (e.g., SQL select statement) and identify the table user-defined function (TUDF) being applied to the tables. The checker 153 may further verify whether the caller (or invoker) of the table user-defined function has the necessary privileges (e.g., EXECUTE privileges). Moreover, the checker 153 may verify that the column names and the datatypes of the table returned by the table user-defined function match the expected table type in the relational query language statement (e.g., SQL select statement). The checker 153 may further verify that the quantity, order, and datatypes of the parameters provided in the relational query language statement (e.g., SQL select statement) match the input parameters of the table user-defined function.

Once the checks performed by the checker 153 are successfully completed, the compiler 155 may compile the query and generate a corresponding execution plan for the query. The compilation of the query may include registering the referenced graph workspaces (e.g., direct dependencies) of the table user-defined function (TUDF) as dependencies of the query execution plan. The compiler 155 may insert a call to the executable code associated with the table user-defined function where the table user-defined function is used. In instances where the referenced graph workspace is altered (e.g., due to changes to one or more constituent vertex tables and/or edge tables), the compiler 155 may revalidate the execution plan for the query based on the altered graph workspace. Upon compiling the query, the executor 157 may execute the query based at least on the execution plan for the query. This may include calling the executable code associated with the table user-defined function with the input parameters provided as a part of the relational query language statement (e.g., SQL select statement).

Figure 3:
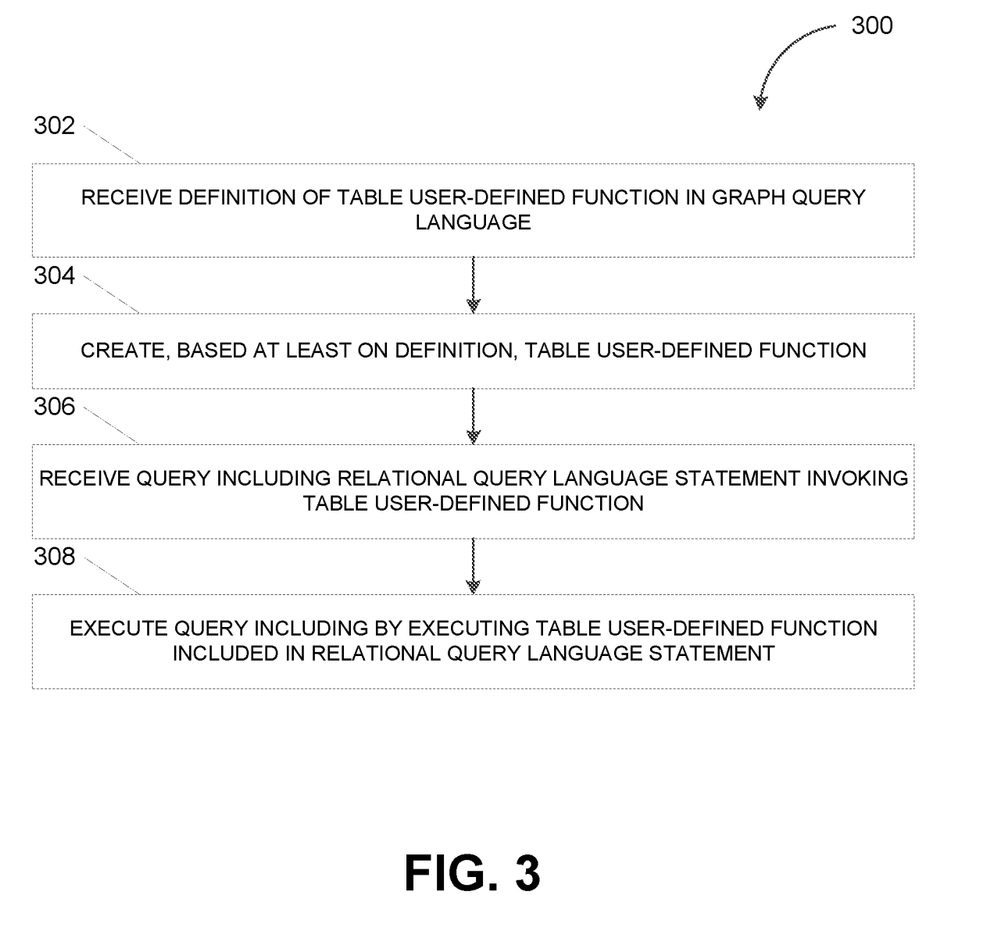
FIG. 3 depicts a flowchart illustrating an example of a process for ad hoc graph data processing, in accordance with some example embodiments.

FIG. 3 depicts a flowchart illustrating an example of a process 300 for a table user-defined function (TUDF), in accordance with some example embodiments. Referring to FIGS. 1-3, the process 300 may be performed by the database management system 120, for example, the processing engine 125, to create and use a table user-defined function (TUDF), which is defined in a graph query language (e.g., GraphScript) for invocation in a relational query language statement (e.g., a SQL select statement).

At 302, the processing engine 125 may receive a definition of a table user-defined function in a graph query language. In some example embodiments, the processing engine 125 may receive, from the client device 130, the graph processing algorithm 135 defined as a table user-defined function (TUDF). For example, the table user-defined function (TUDF) may be defined in a graph query language (e.g., GraphScript) and executed on the graph data 115 stored in the database 110 to output tabular data. As such, the graph processing algorithm 135, which is defined in a query processing language (e.g., GraphScript) may be wrapped in SQLScript table user-defined function (TUDF) in order to be used in a relational query language statement (e.g., Structured Query Language (SQL) statement). Defined as a table user-defined function (TUDF), the graph processing algorithm 135 may be invoked from a relational query language statement (e.g., Structured Query Language (SQL)) such as the FROM clause of a SQL select statement.

At 304, the processing engine 125 may create, based at least on the definition, the table user-defined function. In some example embodiments, the processing engine 125 may create, based at least on the definition of the graph processing algorithm 135, a corresponding table user-defined function (TUDF). For example, to create the table user-defined function, the compiler 155 of the processing engine 125 may compile the definition of the table user-defined function once the definition passes the checks performed by the checker 153. During the compilation of the table user-defined function, the compiler 155 may compile the definition of the table user-defined function in the graph query language (e.g., GraphScript) to generate executable code. The compilation of the table user-defined function may include verifying the existence and validity of the referenced graph workspaces and ensuring that the creator (or definer) of the table user-defined function (TUDF) has the necessary privileges to create the function (e.g., CREATE FUNCTION priviledge) and the select privilege on the accessed workspaces. Furthermore, the compilation of the table user-defined function definition may include the compiler 155 verifying that the table type of the table output by the table user-defined function match the one defined in the function signature and that each execution path within the definition returns the same table type. Upon compiling the definition of the table user-defined function, the corresponding executable code may be stored for subsequent execution by the executor 157 of the processing engine 125. Subsequent changes to a referenced graph workspace may trigger a recompilation of the table user-defined function definition. For instance, a graph workspace referenced by the table user-defined function may change due to changes to a vertex table and/or an edge table included the graph workspace (e.g. a table is dropped, a column is added or dropped, and/or the like), in which case the table user-defined function is recompiled and its validity updated.

At 306, the processing engine 125 may receive a query including a relational query language statement invoking the table user-defined function. In some example embodiments, once compiled, the table user-defined function may be used in a query, such as in one or more relational query language statements contained in the query. For example, the processing engine 125 may receive, from the client device 130, a relational query language statement, such as a SQL select statement, that invokes the table user-defined function (TUDF) corresponding to the graph processing algorithm 135. In some cases, the table user-defined function may be invoked in the FROM clause of the SQL select statement.

At 308, the processing engine 125 may execute the query including by executing the table user-defined function included in the relational query language statement. In some example embodiments, the executor 157 may call the executable code associated with the table user-defined function in order to execute the query invoking the table user-defined function (e.g., in a SQL select statement such as the FROM clause of the SQL select statement). To execute the query, the executor 157 may register the graph workspaces referenced by the table user-defined function as direct dependencies of the table user-defined function.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

- Example 1: A system, comprising: at least one data processor; and at least one memory storing instructions, which when executed by the at least one data processor, result in operations comprising: receiving a definition of a table user-defined function (TUDF) in a graph query language; creating, based at least on the definition, the table user-defined function; receiving a query including a relational query language statement invoking the table user-defined function; and executing, on at least a portion of a graph data stored in a database, the query including by executing the table user-defined function included in the relational query language statement.
- Example 2: The system of Example 1, the table user-defined function is defined to perform graph specific processing on a graph workspace containing one or more vertex tables and edge tables forming the graph data.
- Example 3: The system of any of Examples 1 to 2, wherein the operations further comprise: verifying that a schema qualified name of the table user-defined function specified in the definition is unique within a schema of a graph workspace referenced in the definition and adheres to a naming convention associated with the relational query language.
- Example 4: The system of any of Examples 1 to 3, wherein the operations further comprise: verifying that a creator of the table user-defined function has a privilege to define a function and/or replace a function in a given schema.
- Example 5: The system of any of Examples 1 to 4, wherein the operations further comprise: compiling the definition of the table user-defined function to generate an executable code associated with the table user-defined function.
- Example 6: The system of Example 5, wherein the compiling of the definition of the table user-defined function includes verifying an existence and validity of one or more graph workspaces referenced in the definition of the table use-defined function.
- Example 7: The system of any of Examples 5 to 6, wherein the compiling of the definition of the table user-defined function includes verifying that a first table type of a table output by the table user-defined function matches a second table type defined in a function signature.
- Examples 8: The system of any of Examples 5 to 7, wherein the compiling of the definition of the table user-defined function includes verifying that each execution path within the definition returns a same table type.
- Example 9: The system of any of Examples 5 to 8, wherein the table user-defined function is executed by at least calling the executable code associated with the table user-defined function.
- Example 10: The system of any of Examples 1 to 9, wherein the table user-defined function implements a graph processing algorithm comprising one or more of subgraph, inverse graph, in-degree, out-degree, incoming edges, outgoing edges, neighbors, is-reachable, shortest path, shortest path one to all, k shortest paths, strongly connected components, depth first traversal, and breadth first traversal.
- Example 11: The system of any of Examples 1 to 10, wherein the graph query language comprise GraphScript.
- Example 12: The system of any of Examples 1 to 11, wherein the relational query language statement is a structured query language (SQL) select statement, and wherein the table user-defined function is invoked in a FROM clause of the SQL select statement.
- Example 13: The system of any of Examples 1 to 12, wherein the table user-defined function provides read-only access to the graph data.
- Example 14: The system of any of Examples 1 to 13, wherein the definition of the table user-defined function specifies one or more of a name of the table user-defined function, a schema name of the table user-defined function, a parameter of the table user-defined function, a security mode of the table user-defined function, and a type of table output by the table user-defined function.
- Example 15: A computer-implemented method, comprising: receiving a definition of a table user-defined function (TUDF) in a graph query language; creating, based at least on the definition, the table user-defined function; receiving a query including a relational query language statement invoking the table user-defined function; and executing, on at least a portion of a graph data stored in a database, the query including by executing the table user-defined function included in the relational query language statement.
- Example 16: The method of Example 15, wherein the table user-defined function is defined to perform graph specific processing on a graph workspace containing one or more vertex tables and edge tables forming the graph data.
- Example 17: The method of any of Examples 15 to 16, further comprising: verifying that a schema qualified name of the table user-defined function specified in the definition is unique within a schema of a graph workspace referenced in the definition and adheres to a naming convention associated with the relational query language.

Example 18: The method of any of Examples 15 to 17, further comprising: verifying that a creator of the table user-defined function has a privilege to define a function and/or replace a function in a given schema.

Example 19: The method of any of Examples 15 to 18, further comprising: compiling the definition of the table user-defined function to generate an executable code associated with the table user-defined function, the compiling of the definition of the table user-defined function includes verifying an existence and validity of one or more graph workspaces referenced in the definition of the table use-defined function, verifying that a first table type of a table output by the table user-defined function matches a second table type defined in a function signature, and verifying that each execution path within the definition returns a same table type; and executing the table user-defined function by at least calling the executable code associated with the table user-defined function.

Example 20: A non-transitory computer readable medium storing instructions, which when executed by at least one data processor, result in operations comprising: receiving a definition of a table user-defined function (TUDF) in a graph query language; creating, based at least on the definition, the table user-defined function; receiving a query including a relational query language statement invoking the table user-defined function; and executing, on at least a portion of a graph data stored in a database, the query including by executing the table user-defined function included in the relational query language statement.

Figure 4:
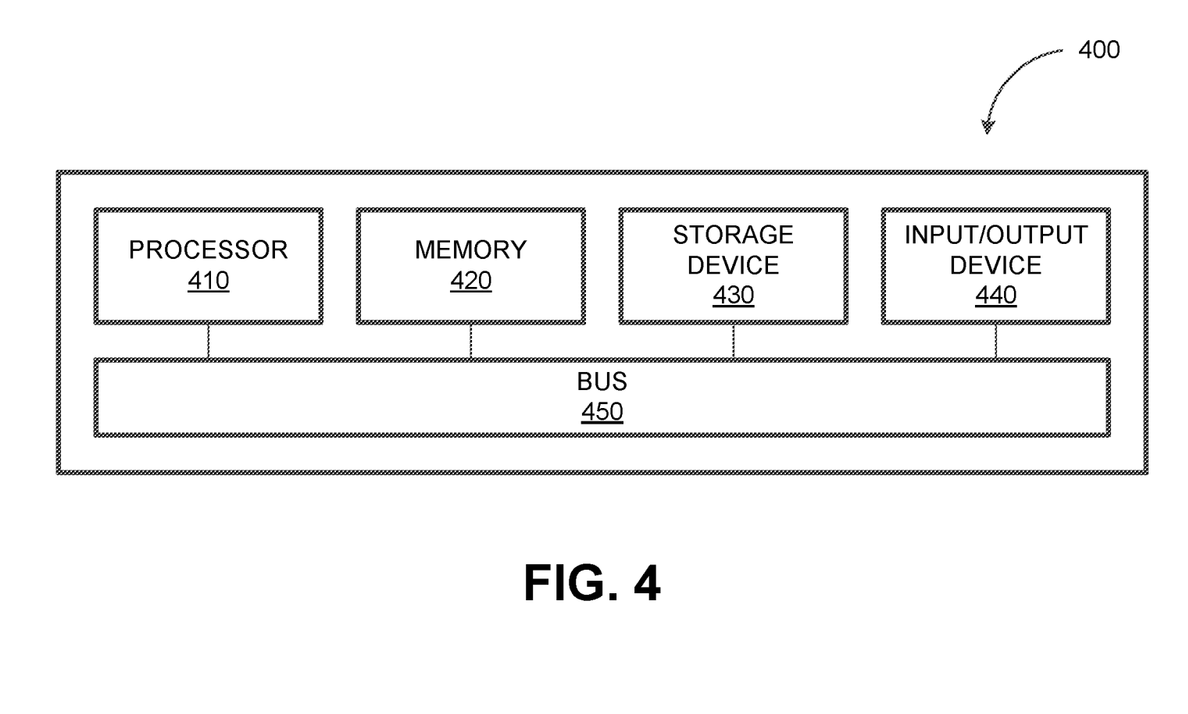
FIG. 4 depicts a block diagram illustrating an example of a computing system, in accordance with some example embodiments.

FIG. 4 depicts a block diagram illustrating an example of a computing system 400 consistent with implementations of the current subject matter. Referring to FIGS. 1-4, the computing system 400 can be used to implement the database management system 110 and/or any components therein.

As shown in FIG. 4, the computing system 400 can include a processor 410, a memory 420, a storage device 430, and an input/output device 440. The processor 410, the memory 420, the storage device 430, and the input/output device 440 can be interconnected via a system bus 450. The processor 410 is capable of processing instructions for execution within the computing system 400. Such executed instructions can implement one or more components of, for example, the database management system 110. In some example embodiments, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid state drive, a floppy disk device, a hard disk device, an optical disk device, or a tape device, or other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving a definition of a table user-defined function in a graph query language;
   creating, based at least on the definition, the table user-defined function;
   compiling the definition of the table user-defined function to generate executable code associated with the table user-defined function, wherein the compiling of the definition of the table user-defined function includes verifying an existence and validity of one or more graph workspaces referenced in the definition of the table user-defined function;
   receiving a query including a relational query language statement invoking the table user-defined function; and
   executing, on at least a portion of a graph data stored in a database, the query including by executing the table user-defined function included in the relational query language statement.

2. The system of claim 1, wherein the table user-defined function is defined to perform graph specific processing on a graph workspace containing one or more vertex tables and edge tables forming the graph data.

3. The system of claim 1, wherein the operations further comprise:
   verifying that a schema qualified name of the table user-defined function specified in the definition is unique within a schema of a graph workspace referenced in the definition and adheres to a naming convention associated with the relational query language statement.

4. The system of claim 1, wherein the operations further comprise:
   verifying that a creator of the table user-defined function has a privilege to define a function and/or replace a function in a given schema.

5. The system of claim 1, wherein the compiling of the definition of the table user-defined function includes verifying that a first table type of a table output by the table user-defined function matches a second table type defined in a function signature.

6. The system of claim 1, wherein the compiling of the definition of the table user-defined function includes verifying that each execution path within the definition returns a same table type.

7. The system of claim 1, wherein the table user-defined function is executed by at least calling the executable code associated with the table user-defined function.

8. The system of claim 1, wherein the table user-defined function implements a graph processing algorithm comprising one or more of subgraph, inverse graph, in-degree, out-degree, incoming edges, outgoing edges, neighbors, is-reachable, shortest path, shortest path one to all, k shortest paths, strongly connected components, depth first traversal, and breadth first traversal.

9. The system of claim 1, wherein the graph query language comprise GraphScript.

10. The system of claim 1, wherein the relational query language statement is a structured query language (SQL) select statement, and wherein the table user-defined function is invoked in a FROM clause of the SQL select statement.

11. The system of claim 1, wherein the table user-defined function provides read-only access to the graph data.

12. The system of claim 1, wherein the definition of the table user-defined function specifies one or more of a name of the table user-defined function, a schema name of the table user-defined function, a parameter of the table user-defined function, a security mode of the table user-defined function, and a type of table output by the table user-defined function.

13. A computer-implemented method, comprising:
receiving a definition of a table user-defined function in a graph query language;
creating, based at least on the definition, the table user-defined function;
compiling the definition of the table user-defined function to generate executable code associated with the table user-defined function, wherein the compiling of the definition of the table user-defined function includes verifying an existence and validity of one or more graph workspaces referenced in the definition of the table user-defined function;
receiving a query including a relational query language statement invoking the table user-defined function; and
executing, on at least a portion of a graph data stored in a database, the query including by executing the table user-defined function included in the relational query language statement.

14. The method of claim 13, wherein the table user-defined function is defined to perform graph specific processing on a graph workspace containing one or more vertex tables and edge tables forming the graph data.

15. The method of claim 13, further comprising:
verifying that a schema qualified name of the table user-defined function specified in the definition is unique within a schema of a graph workspace referenced in the definition and adheres to a naming convention associated with the relational query language statement.

16. The method of claim 13, further comprising:
verifying that a creator of the table user-defined function has a privilege to define a function and/or replace a function in a given schema.

17. The method of claim 13, wherein the compiling further comprises:
verifying that a first table type of a table output by the table user-defined function matches a second table type defined in a function signature, and
verifying that each execution path within the definition returns a same table type; and
executing the table user-defined function by at least calling the executable code associated with the table user-defined function.

18. A non-transitory computer readable medium storing instructions, which when executed by at least one data processor, result in operations comprising:
receiving a definition of a table user-defined function in a graph query language;
creating, based at least on the definition, the table user-defined function;
compiling the definition of the table user-defined function to generate executable code associated with the table user-defined function, wherein the compiling of the definition of the table user-defined function includes verifying an existence and validity of one or more graph workspaces referenced in the definition of the table user-defined function;
receiving a query including a relational query language statement invoking the table user-defined function; and
executing, on at least a portion of a graph data stored in a database, the query including by executing the table user-defined function included in the relational query language statement.

\* \* \* \* \*